(12) United States Patent
Sakurai et al.

(10) Patent No.: US 6,973,220 B2
(45) Date of Patent: Dec. 6, 2005

(54) IMAGE PROCESSING METHOD, IMAGE PROCESSING APPARATUS AND IMAGE PROCESSING PROGRAM

(75) Inventors: Mikio Sakurai, Amagasaki (JP); Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 605 days.

(21) Appl. No.: 10/109,397

(22) Filed: Mar. 28, 2002

(65) Prior Publication Data

US 2002/0140823 A1    Oct. 3, 2002

(30) Foreign Application Priority Data

Mar. 30, 2001 (JP) .............................. 2001-100655

(51) Int. Cl.[7] .......................... G06K 9/40; H04N 5/225
(52) U.S. Cl. .................................. 382/266; 348/207.99
(58) Field of Search .............................. 382/173, 190, 382/255, 260, 264, 266, 275, 284, 312; 348/207.99, 348/208.99, 208.4; 358/3.26, 533; 396/52

(56) References Cited

U.S. PATENT DOCUMENTS

| | | | |
|---|---|---|---|
| 5,557,339 A * | 9/1996 | Dadourian ................... 348/586 |
| 6,269,195 B1 * | 7/2001 | Gonsalves et al. .......... 382/284 |
| 6,522,791 B2 * | 2/2003 | Nagarajan ................... 382/321 |
| 6,556,784 B2 * | 4/2003 | Onuki .......................... 396/52 |
| 6,741,755 B1 * | 5/2004 | Blake et al. ................. 382/284 |

FOREIGN PATENT DOCUMENTS

JP    2000-259823 A    9/2000

OTHER PUBLICATIONS

Masahiko Naito, Kazuya Kodama, Kiyoharu Aizawa, and Mitsutoshi Hatori, "Enhanced Image Acquisition by Using Multiple Differently Focused Images", Transactions of the Institute of Electronics, Information and Communication Engineers D-II, vol. 79-D-II, No. 6, pp. 1046-1053, Jun. 1996 (including translation).

* cited by examiner

Primary Examiner—Kanjibhai Patel
(74) Attorney, Agent, or Firm—Sidley Austin Brown & Wood LLP

(57) ABSTRACT

An image processing method includes the steps of obtaining an image in which a first area including a first image and a second area including a second image are discriminated with each other, and a control step for performing a blur control to a second image using a filter to obtain a blur-controlled second image while accompanying processing for reducing an influence of the first area at a boundary between the first area and the second area and therearound when the blur control is performed to the second image.

17 Claims, 13 Drawing Sheets

FIG. 1
(PRIOR ART)
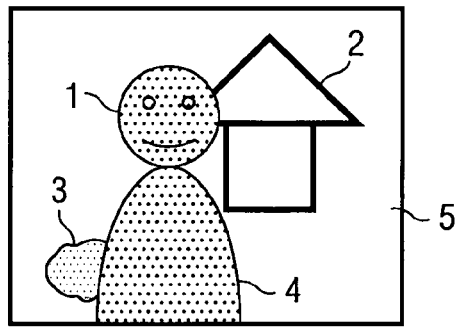
FIG. 2
(PRIOR ART)
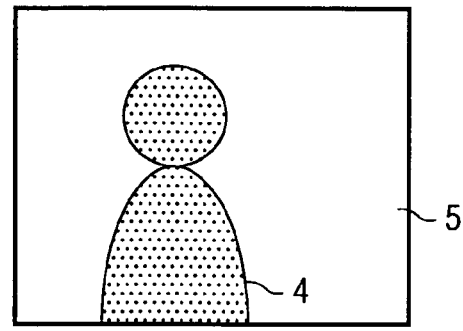
FIG. 3A
(PRIOR ART)
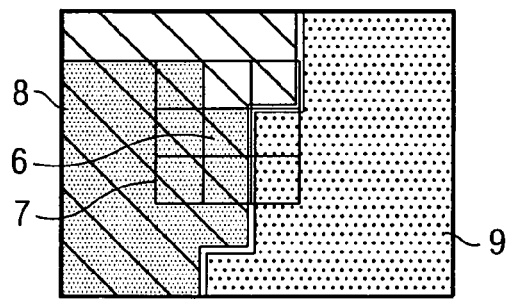
FIG. 3B
(PRIOR ART)
| 1/10 | 1/10 | 1/10 |
|------|------|------|
| 1/10 | 2/10 | 1/10 |
| 1/10 | 1/10 | 1/10 |
FIG. 3C
(PRIOR ART)
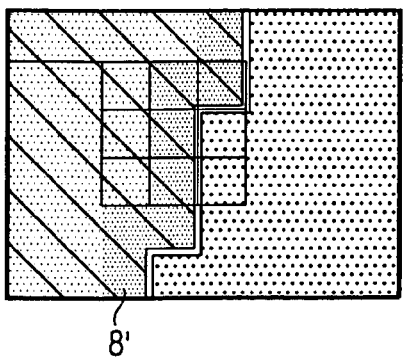

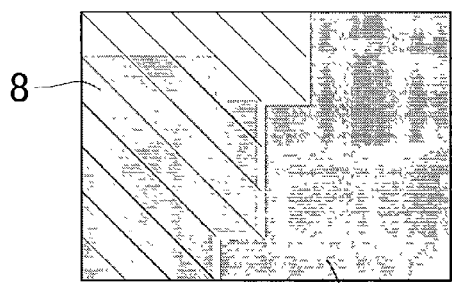
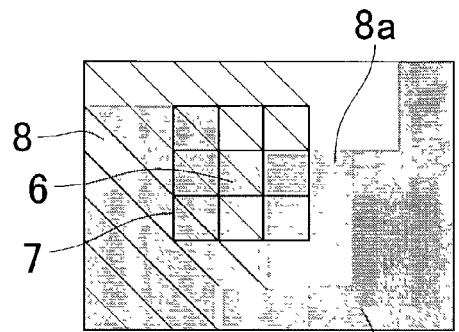
FIG. 7A  FIG. 7B
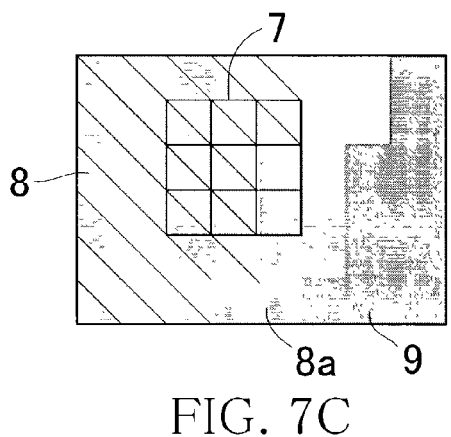
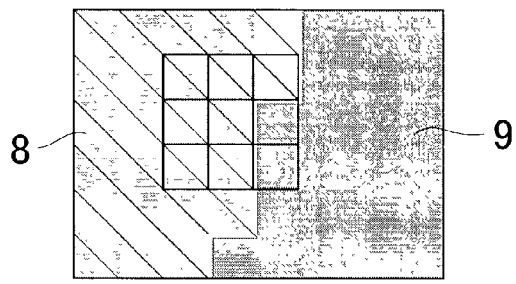
FIG. 7C  FIG. 7D
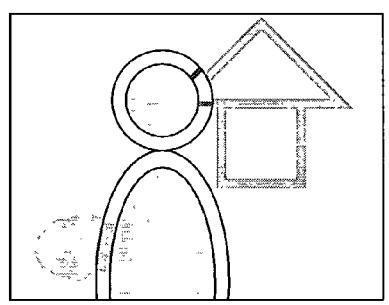
FIG. 8
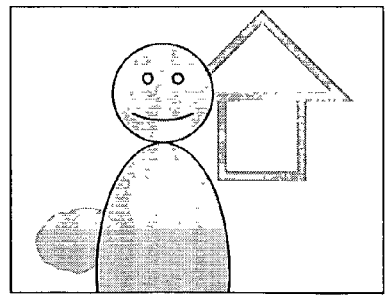
FIG. 9

4 FIG. 10A 5

IMAGE PROCESSING METHOD, IMAGE PROCESSING APPARATUS AND IMAGE PROCESSING PROGRAM

This application claims priority to Japanese Patent Application No. 2001-100655 filed on Mar. 30, 2001, the disclosure of which is incorporated by reference in its entirety.

BACKGROUND OF THE INVENTION

1. Field of the Invention

The present invention relates to an image processing method for creating a blur-controlled image by performing a blur-control processing to an image obtained by a digital camera or the like. It also relates to an image processing apparatus and an image processing program.

2. Description of Related Art

In photographing, it is possible to emphasize the main photographic object by unsharpening or dimming (hereinafter referred to as "blur") the background and also possible to arbitrarily alter the emphasis degree of the main photographic object by changing the blur degree of the background. Although it is possible to change the blur degree in a camera capable of arbitrarily changing the aperture value so as to alter a depth of field, it is difficult to do so in a camera in which the aperture value is determined automatically.

In recent years, digital cameras have become popular. In digital cameras, it became possible to add various effects to an image by processing the image data. Furthermore, it also became possible to add various effects to a specific area in an image by an area dividing method by clustering or an area discrimination method in which a photographic object image is taken out from two images different in focal length based on the blur difference thereof.

For example, a blur-controlled image in which the main photographic object is emphasized can be created by applying a filter to the background. To the contrary, a blur-controlled image in which the background is emphasized can be created by applying a filter to the main photographic object. Furthermore, a pan-focus image can be also created by combining focused portions in two images.

In a conventional method, however, even if a desired area is taken out perfectly at the time of applying a blur-filter thereto, a pixel value of a pixel outside the desired area near a boundary is also taken in. As a result, a desired blurred image could not be obtained. This will be explained with reference to FIGS. 1 to 4.

FIGS. 1 to 4 explain the situation at the time of carrying out a background blur emphasizing processing to an image.

FIG. 1 shows a landscape image including a person 1, a house 2 and a pond 3. This image shown in FIG. 1 is focused on a person 1, and includes a clear person image 1 as a main photographic object in the foreground and slightly blurred images of a house 2 and a pond 3 in the background. This image is a far-and-near conflict image including unfocused images in the background area and a focused image in the main photographic object area in the same image frame.

In this image, it is discriminated such that the focused person image is an image in the main photographic object area 4 and that the unfocused landscape image including the house 2, the pond 8 and therearound is an image in the background area 5. The target area to which a blur-filter is to be applied is cut out by an area discrimination method. As shown in FIG. 2, it is assumed that the image in the main photographic object area 4 has been cut out from the image shown in FIG. 1 by the area discrimination method.

By subjecting the image shown in FIG. 1 to predetermined filtering processing, a blur emphasized image is created. In this specification, a method for creating a background blur emphasized image in which the blur degree in the background area is emphasized will be explained.

FIG. 3 is an enlarged view showing the boundary portion between the image in the main photographic object area and the image in the background area shown in FIG. 1 for an explanation of the blur emphasizing processing in the boundary portion. The area with oblique lines denotes the background area 8, and the remaining area denotes the main photographic object area 9. A blur-filter 7 is applied to the aimed pixel 6 of the image in the background region 8. This blur-filter 7 is shown in FIG. 3B.

In the event that the blur-filter 7 shown in FIG. 3B is applied to the pixel 6 near the boundary, this filter 7 covers not only the image in the background area 8 but also a part of the image in the main photographic object area 9. Therefore, the aimed pixel 6 after the filtering processing includes the pixel value of the pixel in the part of the main photographic object area 9, which creates a blur fault portion 8' (see FIG. 3C). FIG. 4A shows a filtered image obtained by subjecting the entire area of the image shown in FIG. 1 to blur-filtering processing. At near the boundary of the background area 5 to which the blur-filtering processing was performed, the pixel value is a mixed value of the pixel value of the skin color of the person image and that of the dress color. This portion including the mixed value remains as a fault portion 8' at the periphery of the main photographic object area 4 as shown in FIG. 4B when the previously cut-out image (FIG. 2) in the main photographic object area 4 is pasted on the aforementioned filtered image.

As mentioned above, in a conventional method, a good blur cannot be given to the boundary when applying a blur-filter to the image in the aimed area.

SUMMARY OF THE INVENTION

It is an object of the present invention to provide an image processing method capable of creating a good blur by blur-control processing.

It is another object of the present invention to provide an image processing apparatus for performing blur-control processing capable of creating a good blur.

It is still another object of the present invention to provide a program for making a computer execute blur-control processing capable of creating a good blur.

According to the first aspect of the present invention, an image processing method comprises the steps of:

obtaining an image in which a first area including a first image and a second area including a second image are discriminated with each other; and a control step for performing a blur control to a second image using a filter to obtain a blur-controlled second image while accompanying processing for reducing an influence of the first area at a boundary between the first area and the second area and therearound when the blur control is performed to the second image.

According to this image processing method, when a blur control is performed to the second image by the filter, a blur control is performed to the second image while accompanying processing for reducing an influence of the first area at a boundary between the first area and the second area and therearound. Accordingly, it is possible to avoid performing the blur control in a state that the influence of the first area appears as it is in the second area near the boundary, and therefore a good blur-controlled image can be obtained.

According to the second aspect of the present invention, an image processing apparatus, comprises;

a processor for obtaining an image in which a first area including a first image and a second area including a second image are discriminated with each other; and a blur controller for performing a blur control to a second image using a filter to obtain a blur-controlled second image while accompanying processing for reducing an influence of the first area at a boundary between the first area and the second area and therearound when the blur control is performed to the second image.

According to this image processing apparatus, when a blur control is performed to the second image by the filter, a blur control is performed to the second image while accompanying processing for reducing an influence of the first area at a boundary between the first area and the second area and therearound. Accordingly, the influence of the first area would not appear in the second area near the boundary.

According to the third aspect of the present invention, a computer readable program for attaining the following functions:

obtaining an image in which a first area having a first image and a second area having a second image are discriminated with each other; and performing a blur control to a second image using a filter to obtain a blur-controlled second image while accompanying processing for reducing an influence of the first area at a boundary between the first area and the second area and therearound when the blur control is performed to the second image.

According to this program, when a blur control is performed to the second image by the filter, a computer performs a blur control to the second image while accompanying processing for reducing an influence of the first area at a boundary between the first area and the second area and therearound. Accordingly, an image in which the influence of the first area is reduced in the second area near the boundary can be obtained.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which:

FIG. 1 shows a far-and-near conflict image including a main photographic object image and a background image;

FIG. 2 shows a state in which an image in the main photographic object area and an image in the background area are discriminated;

FIGS. 3A to 3C are explanatory views showing a conventional blur emphasizing processing at the boundary between the image in the main photographic object area and the image in the background area;

FIGS. 7A to 7D are explanatory views showing an image processing method according to the first embodiment of the present invention;

FIG. 8 shows an image obtained by applying the image processing method shown in FIGS. 7A to 7D to the entire image shown in FIG. 6;

FIG. 9 shows a composite image obtained by pasting the original image in the main photographic object area on the image shown in FIG. 8;

FIGS. 10A to 10F are explanatory views of a method for giving a pixel value of a pixel in a background area to the boundary and therearound in the cut-out main photographic object area;

DETAILED DESCRIPTION OF THE PREFERRED EMBODIMENTS

Figure 4A:
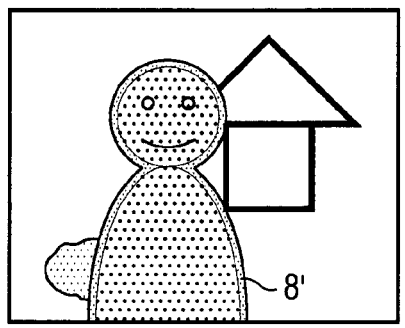
FIGS. 4A and 4B show images obtained by performing blur-filter processing to the entire image shown in FIG. 1.
Figure 4B:
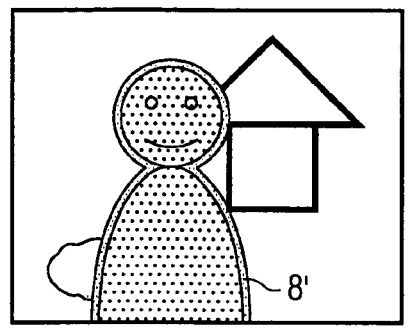
Figure 5A:
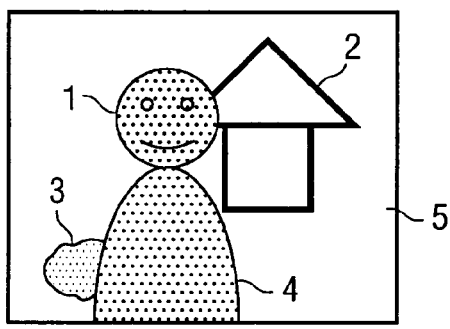
FIG. 5A shows a far-and-near conflict image including a main photographic object image and a background image.

First, the image processing method according to the first embodiment will be explained with reference to a landscape image including an image of a person 1 as the main photographic object and images of a house 2 and a pond 3 as the background as shown in FIG. 5A. FIG. 5A shows an image focused on the person 1. In this image, the person 1 as the main photographic object in the foreground is taken clearly, while the house 2 and the pond 3 in the background are slightly blurred. This image is a far-and-near conflict image including an unfocused image in the background area and a focused image in the main photographic object area. In this embodiment, although an image in the main photographic object area is explained as a "person image" at the time of a blur control operation, it is not necessary to limit the image in the main photographic object area to a "person image." Furthermore, although a "house" and a "pond" are exemplified as the images in the background area, it is not necessary to limit the images in the background area to the images of a "house" and a "pond."

Figure 5B:
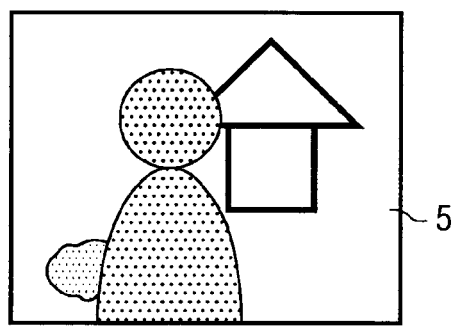
FIG. 5B shows the background image obtained by cutting out the main photographic object from the entire image and FIG. 5C shows the main photographic object image cut out from the entire image.
Figure 5C:
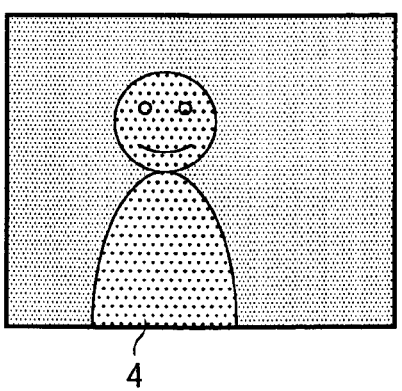

First, from the image shown in FIG. 5A, the image in the first area and that in the second area are cut out. For example, the image in the main photographic object area 4 and the image in the background area 5 are cut out. In FIG. 5B, only the image in the background area 5 is cut out. On the other hand, in FIG. 5C, only the image in the main photographic object area 4 is cut out. The cutout is performed by an area discrimination method. Although this area discrimination method uses blur difference, edge intensity or the like, the cutting out may be performed by any other known technique and/or methods. The image shown in FIG. 6 is created from the image shown in FIG. 5B, and is processed by a blur-filter 7.

Figure 6:
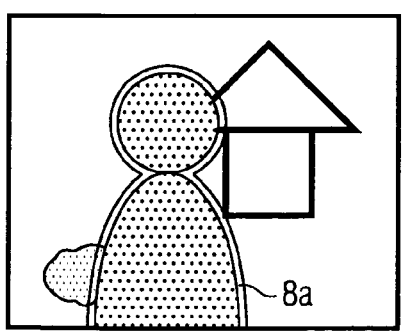
FIG. 6 shows an image in which a pixel value of a pixel in the background area is given to the area near the boundary in the main photographic object area.

FIG. 6 shows an image obtained by giving the pixel value 8a of the pixel in the background area near the boundary between the main photographic object area and the background area to the periphery of the background area in the main photographic object area shown in FIG. 5B after cutting out the image in the main photographic object area. The method for giving the pixel value in this background area will be mentioned later.

FIG. 7A is an enlarged view showing the image of the boundary portion between the main photographic object area and the background area before giving the pixel value 8a (FIG. 5B). FIG. 7B is an enlarged view showing the boundary portion after giving the pixel value 8a (FIG. 6). By applying a blur-filter 7 to the image shown in FIG. 7B, an image shown in FIG. 7C is obtained. In this embodiment, although a 3×3 weighted average filter 7 is used as the blur-filter 7, it is not necessary to limit the size, type of the filter to the 3×3 weighted average filter 7. For example, any filter may be used as long as the filter has a blur making effect such as a Gaussian filter. In a conventional method, as shown in FIG. 3A, the blur-filter 7 located at the aimed pixel 6 covers the image in the main photographic object area 9. To the contrary, in this embodiment, since the pixel value of the pixel near the boundary in the main photographic object area 9 is replaced by the pixel value 8a of the pixel in the background area 8, the pixel value in the main photographic object area 9 would not invade. Accordingly, even at the boundary and therearoud, a blur-filter processing can be performed without causing invasion of the pixel value in the other areas. Then, the original image in the main photographic object area 9 is pasted on the image shown in FIG. 7C to create the image shown, in FIG. 7D. FIG. 8 is an entire view corresponding to FIG. 7C showing an image created by applying the aforementioned image processing method to the entire image near the boundary shown in FIG. 6. Thus, the entire image in the background area can be blurred without incorporating the pixel value of the image in the main photographic object area even at the boundary near the main photographic object area.

FIG. 9 is a final result obtained by pasting the original image in the main photographic object area 4 on the image shown in FIG. 8, and shows an entire drawing corresponding to FIG. 7D. By pasting the image in the main photographic object area 4, the background area information previously given to the area near the boundary in the main photographic object area can be removed.

FIGS. 10A to 10F are drawings for explaining the method for giving the pixel value of the pixel in the background area to the periphery of the image of the background area (i.e., the boundary portion between the main photographic object area and the background area in the main photographic object area) obtained by cutting out the image in the main photographic object area from the entire image.

Figure 10B:
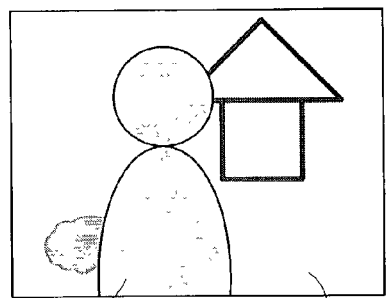
Figure 10B:
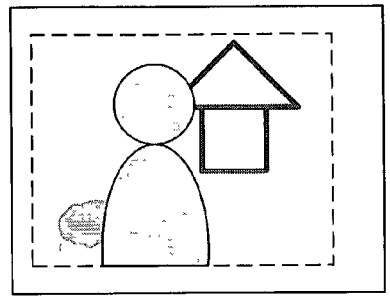
Figure 10C:
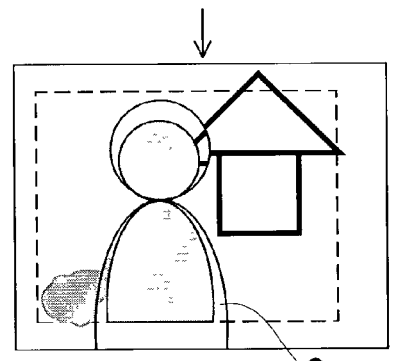

FIG. 10A shows an image obtained by cutting out the image in the main photographic object area 4 from the entire image shown in FIG. 5A showing a far-and-near conflict scene, and FIG. 10B shows an image obtained by reducing the size of the image shown in FIG. 10A at a certain reduction rate. The image shown in FIG. 10A is pasted on this reduced image shown in FIG. 10B to obtain the image shown in FIG. 10C. By this operation, the pixel value 8a in the background area of the reduced image shown in FIG. 10B can be given to the boundary portion in the main photographic object area shown in FIG. 10A.

Figure 10D:
Figure 10D:
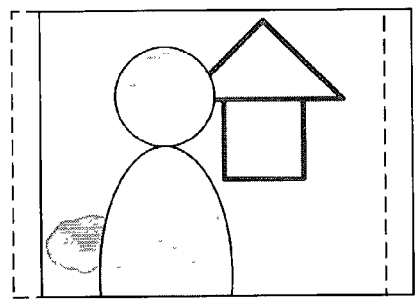
Figure 10E:
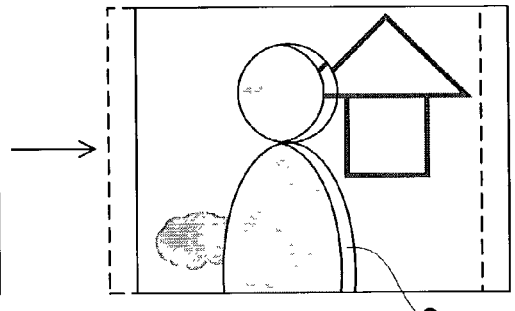
Figure 10F:
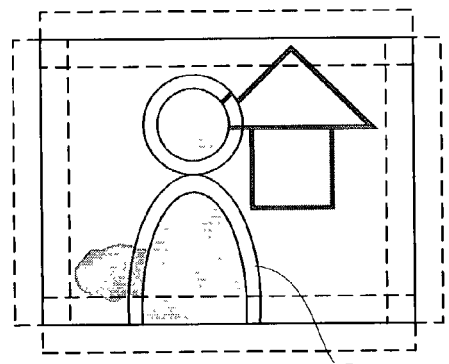

On the other hand, FIG. 10D shows an image obtained by moving the image shown in FIG. 10A from the original position to the left side by a certain number of pixels. By pasting the image shown in FIG. 10A on the moved image shown in FIG. 10D, the pixel value 8a in the background area of the image shown in FIG. 10D can be given to a part of the boundary portion in the previously cut main photographic object area shown in FIG. 10A (see FIG. 10E).

This processing is performed leftward, rightward, upward and downward, to thereby give the pixel value 8a in the background area to the remaining boundary portion in the main photographic object area. As a result, an image in which the information on the background area is given to the entire periphery of the image of the background area (the periphery is in the main photographic object area) can be obtained (see FIG. 10F).

The size of the background area to be given to the main photographic object area is set such that the size is changed according to the size and the type of the blur-filter to be used and that the pixel value in the main photographic object area does not enter the filter even if the filter is applied to any pixel in the background area.

Although the above explanations are directed to two methods, a method in which an image size is reduced and a method in which an image position is moved, a pixel value in the background area may be given to the periphery of the image of the background area by another method.

Figures 11A, 11B:
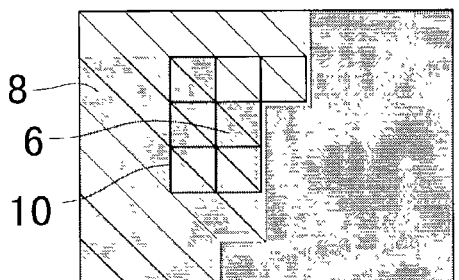
FIGS. 11A to 11C are explanatory views of an image processing method according to the second embodiment of the present invention.
Figure 11C:
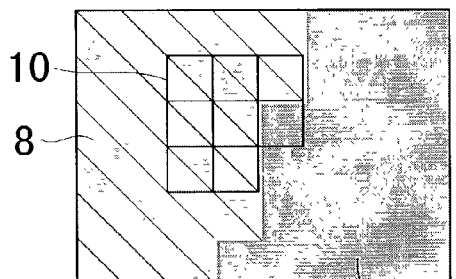

FIGS. 11A to 11C are explanatory views showing the second embodiment of the present invention. FIG. 11A is an enlarged image near the boundary between the background area 8 and the main photographic object area 9. In this embodiment, the configuration of the blur-filter is changed according to the configuration of the background area 8. In this embodiment, the configuration of the blur-filter to the aimed pixel 6 is changed into the configuration corresponding to the boundary of the background area. At this time, the value of the denominator of the weighted average filter also changes along with the size of the filter, and the value becomes the sum of the entire numerator in the filter. This enables to perform the blur processing without invasion of the image information in the other area even at the boundary in the background area and therearound. FIG. 11C is an enlarged view showing the state that the image in the main photographic object area is pasted after the blur processing. This processing also enables to obtain the final composite image as shown in FIG. 9.

FIGS. 12A to 12D are explanatory views showing the third embodiment of the present invention.

Figure 12A:
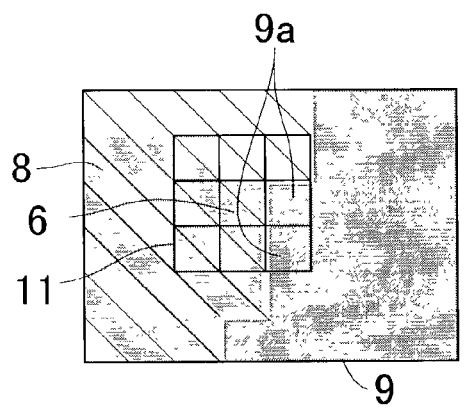
FIGS. 12A to 12D are explanatory views of an image processing method according to the third embodiment of the present invention.
Figure 12B:
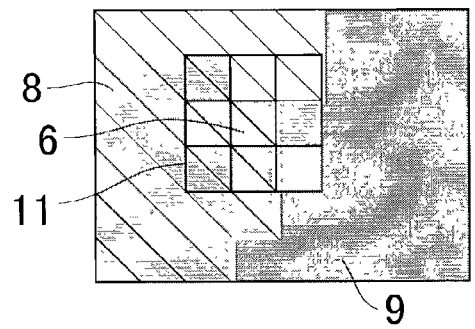
Figures 12C, 12D:
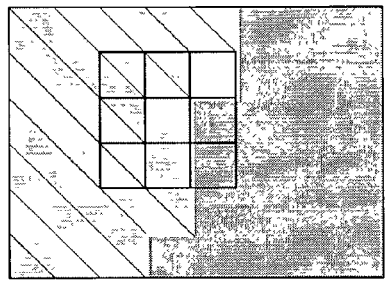

FIG. 12A is an enlarged image near the boundary between the background area 8 and the main photographic object area 9. In this embodiment, in cases where the pixels 9a in the main photographic object area 9 are included in the pixels to be processed in the blur-filter processing as shown in FIG. 12A, the nearest pixel value in the pixels in the background area 8 to be filter processed is used in place of the pixel value of the aforementioned pixel (see FIG. 12B). Consequently, the pixel value in the blur-filter in the aimed pixel 6 becomes that of the filter 11 shown in FIG. 12C. Since this is a filter in the aimed pixel 6, the pixel value in the main photographic object area does not change. Therefore, it is possible to perform the blur processing without invasion of the information in the main photographic object even at the boundary in the background area and therearound. FIG. 12D is an enlarged view showing the state that the image in the main photographic object area is pasted after the blur processing.

By this process shown in FIG. 12, the final composite image as shown in FIG. 9 can be obtained. By the processing method according to the first to the third embodiments, a good blur-controlled image in which only the background is blurred can be obtained without invasion of the pixel value in another area at the time of performing the blur control.

Figure 13:
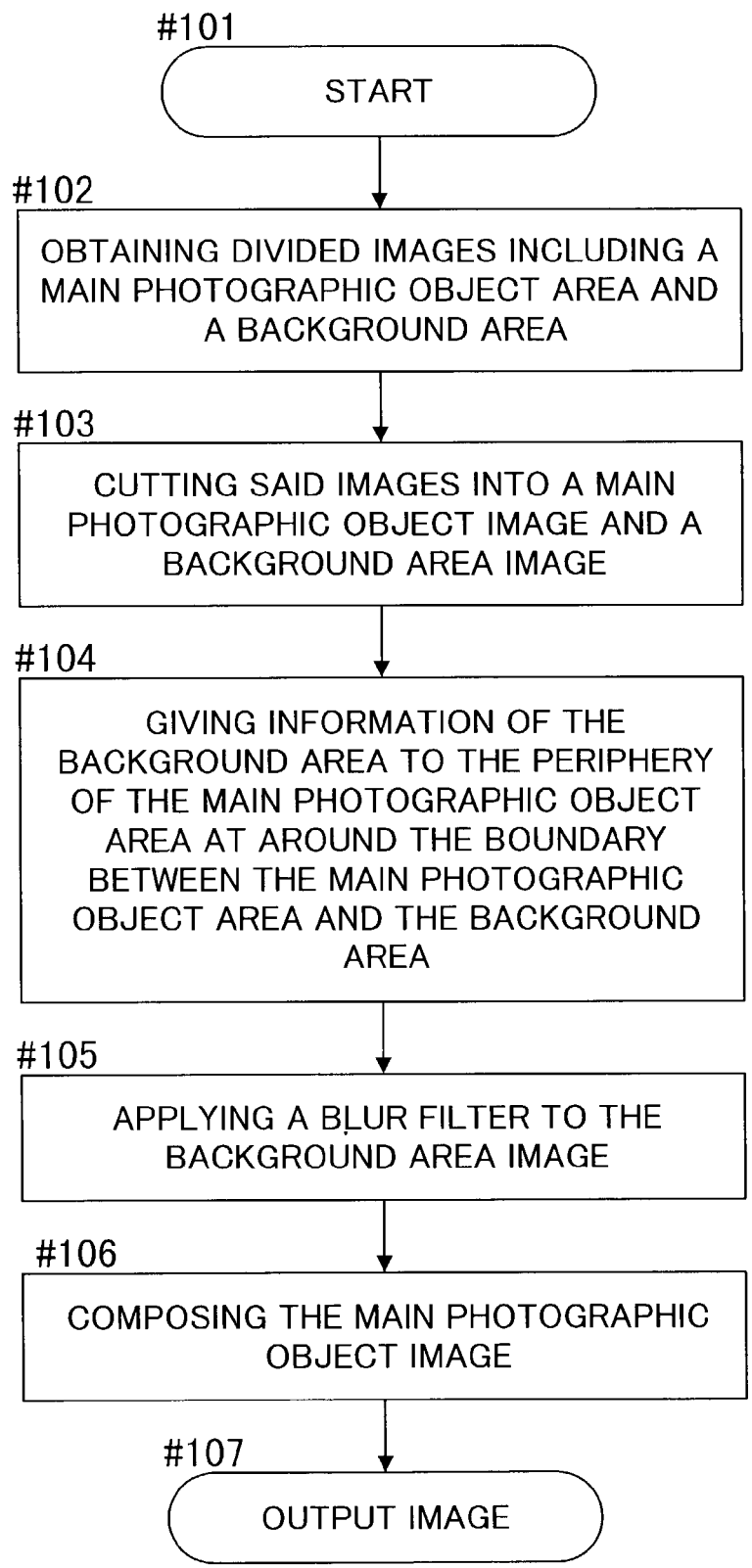
FIG. 13 is a flowchart showing the image processing method according to the first embodiment of the present invention.

FIG. 13 is a flowchart for explaining the flow of the processing of the first embodiment mentioned above. In the following explanation and the drawing, "#" denotes a step.

In FIG. 13, the processing starts in #101. Next, in #102, an input image divided into the background area and the main photographic object area is obtained. In #103, each of the background area and the main photographic object area is cut out to obtain separate images. In #104, the background area pixel value near the boundary is given to the periphery of the background area image (boundary portion in the main photographic object area after cutting out the image in the main photographic object area). In #105, a blur-filter is applied to this image. In #106, the image in the main photographic object area is pasted on this image. In #107, the final image is outputted.

Figure 14:
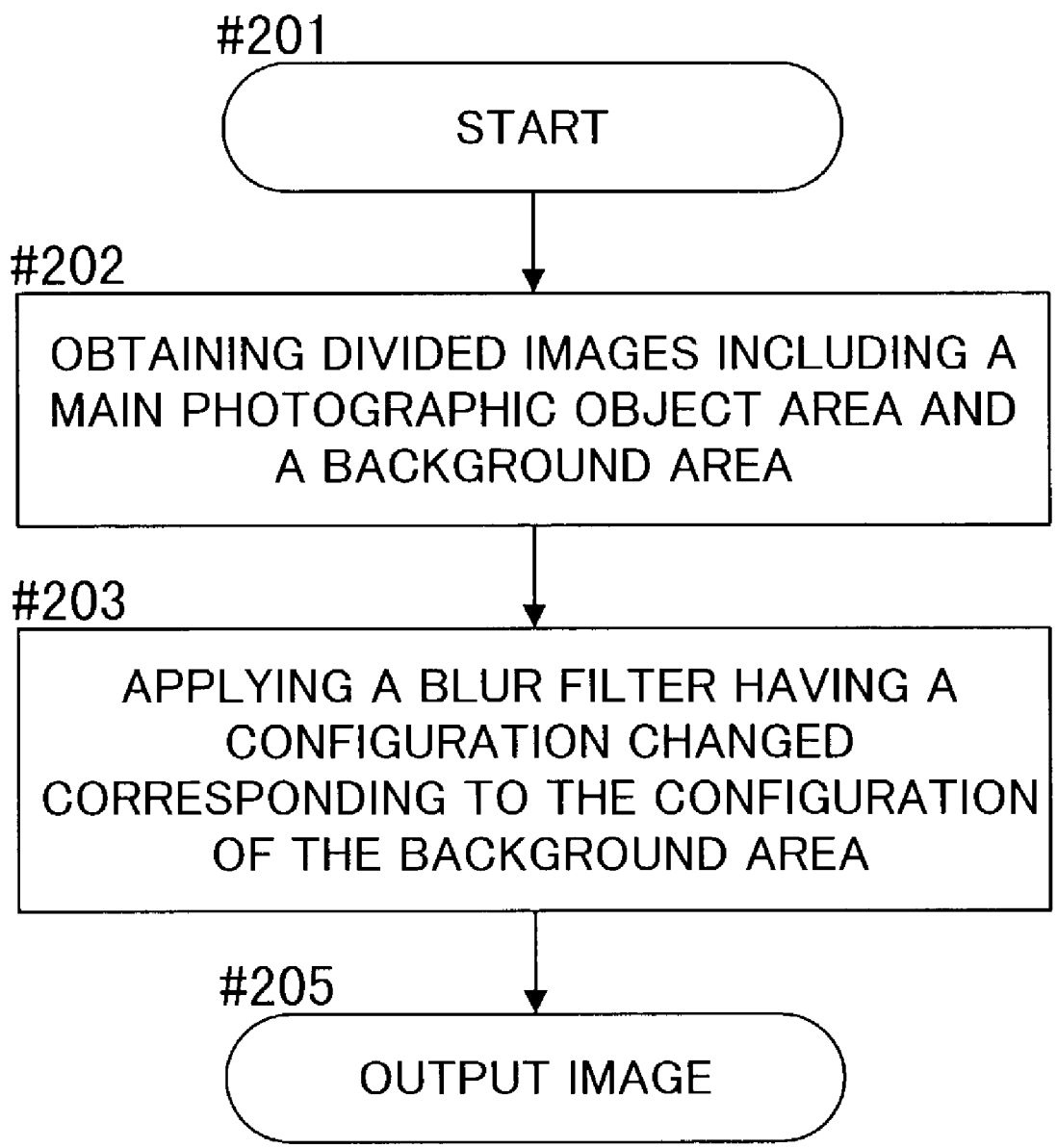
FIG. 14 is a flowchart showing the image processing method according to the second embodiment of the present invention.

FIG. 14 is a flowchart for explaining the flow of the processing in the second embodiment mentioned above. In FIG. 14, the processing starts in #201. Next, in #202, an input image which is divided into the background area and the main photographic object area is obtained. In #203, a blur-filter is applied to this image. At the time of the blur-filter processing at the boundary, the configuration of this blur filter is made to change depending on the configuration of the background area while preventing the invasion of the pixel value of the main photographic object area. In #205, the final image is outputted.

Figure 15:
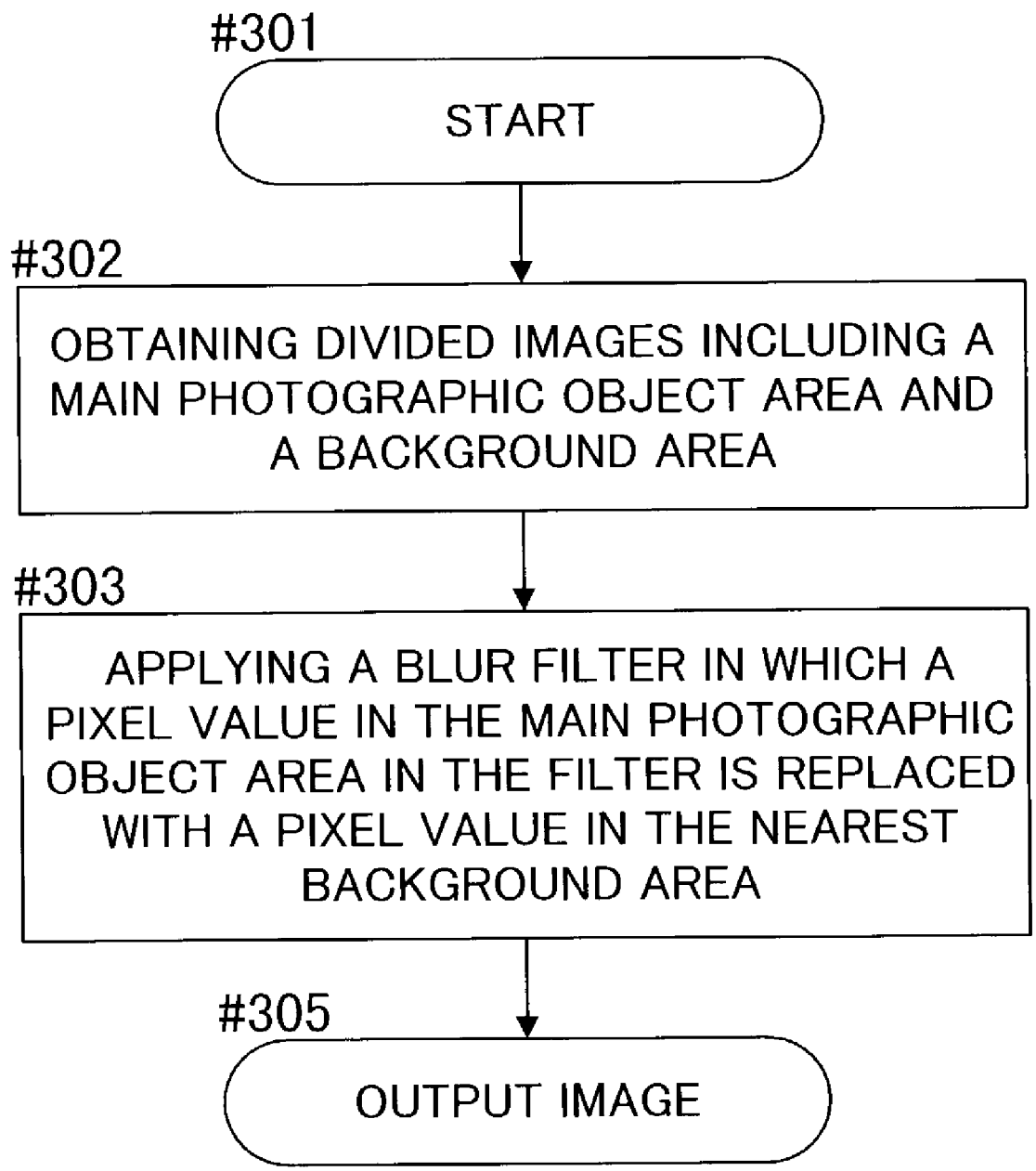
FIG. 15 is a flowchart showing the image processing method according to the third embodiment of the present invention.

FIG. 15 is a flowchart for explaining the flow of the processing of the third embodiment mentioned above. In FIG. 15, the processing starts in #301. Next, in #302, an input image divided into the background area and the main photographic object area is obtained. In #303, a blur-filter is applied to this image. At the time of the blur-filter processing of the boundary and therearoud, the pixel value in the main photographic object area in this blur-filter is replaced with the pixel value in the nearest background area. In #305, the final image is outputted.

Figure 16:
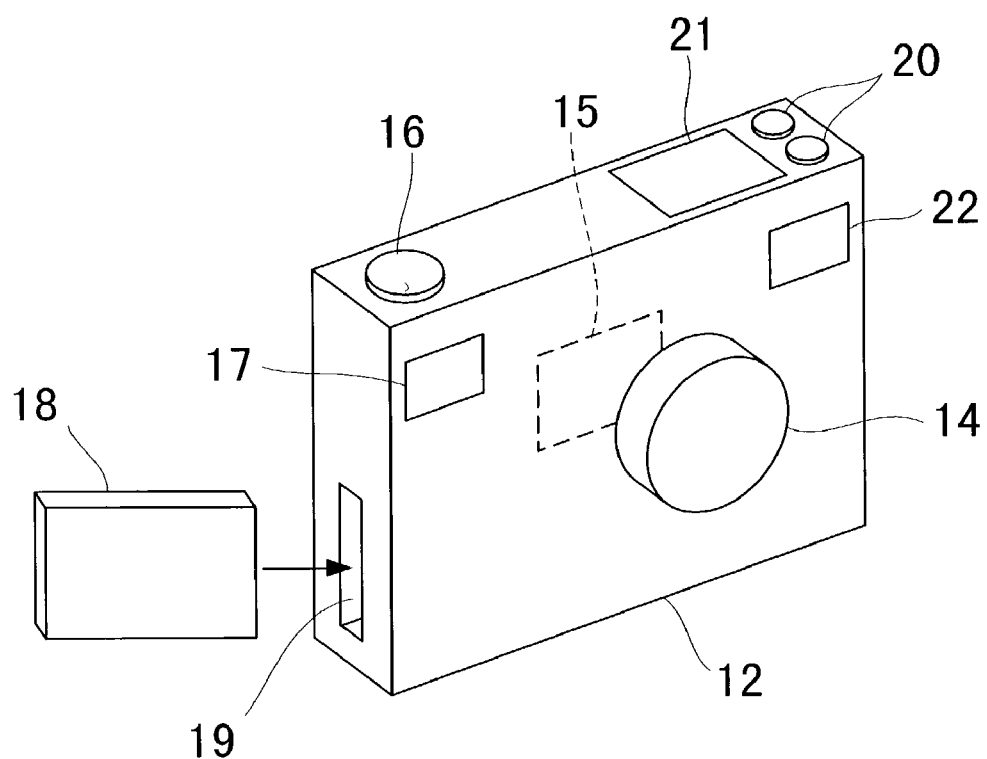
FIG. 16 is a perspective view showing a digital camera i.e., an image processing apparatus which carries out the image processing method according to the first embodiment.
Figure 17:
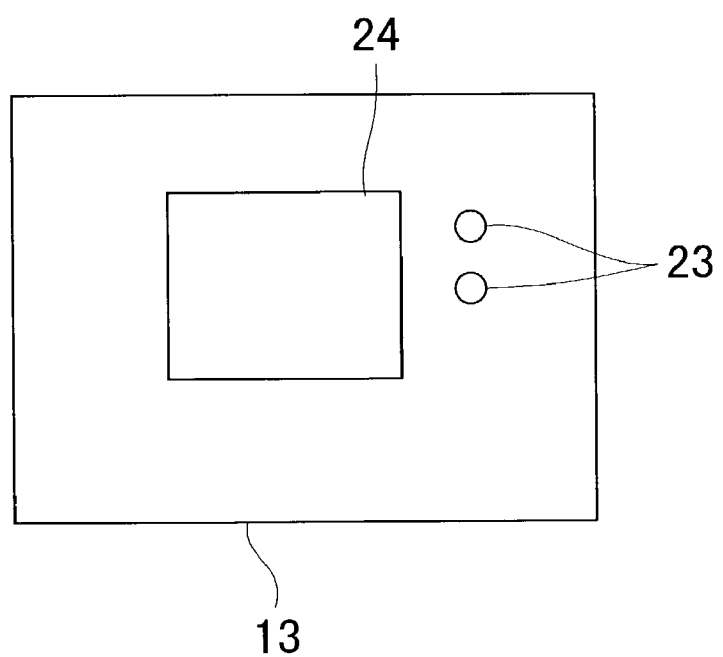
FIG. 17 is a rear view showing the digital camera.

FIGS. 16 and 17 show a digital camera which is an image processing apparatus according to one embodiment of the present invention. FIG. 16 is a perspective view showing the digital camera, and FIG. 17 is the rear view of the digital camera.

In FIGS. 16 and 17, on the front face of the digital camera 12, an image taking lens 14, a finder window 17, a distance measurement window 22, etc. are provided. In the digital camera 12, a CCD15, an example of the image taking element which receives an optical image formed by the aforementioned image taking lens 14 and performs a photoelectric conversion of the optical image, is disposed. An image taking unit including the image taking lens 14 and the CCD 15 is constituted.

Furthermore, on the upper surface of the digital camera 12, a shutter start button 16, photographing mode setting keys 20, a liquid crystal panel 21, etc. are provided. At the side surface of the digital camera 12, the insertion slit 19 into which a recording media 18 such as a memory card is removably inserted is provided.

The photographing mode setting keys 20 are used for setting an exposure condition, such as an aperture priority exposure and a shutter speed priority exposure, changing macro image taking modes or setting a zoom condition while confirming the contents displayed on the liquid crystal display panel 21.

Furthermore, as shown in FIG. 17, an LCD monitor 24 for a live-view display, i.e., a real-time display of a photographic object image, image-processing mode setting keys 23, etc. are provided on the rear face 13 of the digital camera 12. These image-processing mode setting keys 23 are used for selecting a normal processing mode or a blur-control processing mode.

This digital camera 12 can record images picked-up by the CCD 15 into the recording media 18 in the same way as conventional digital cameras.

Figure 18:
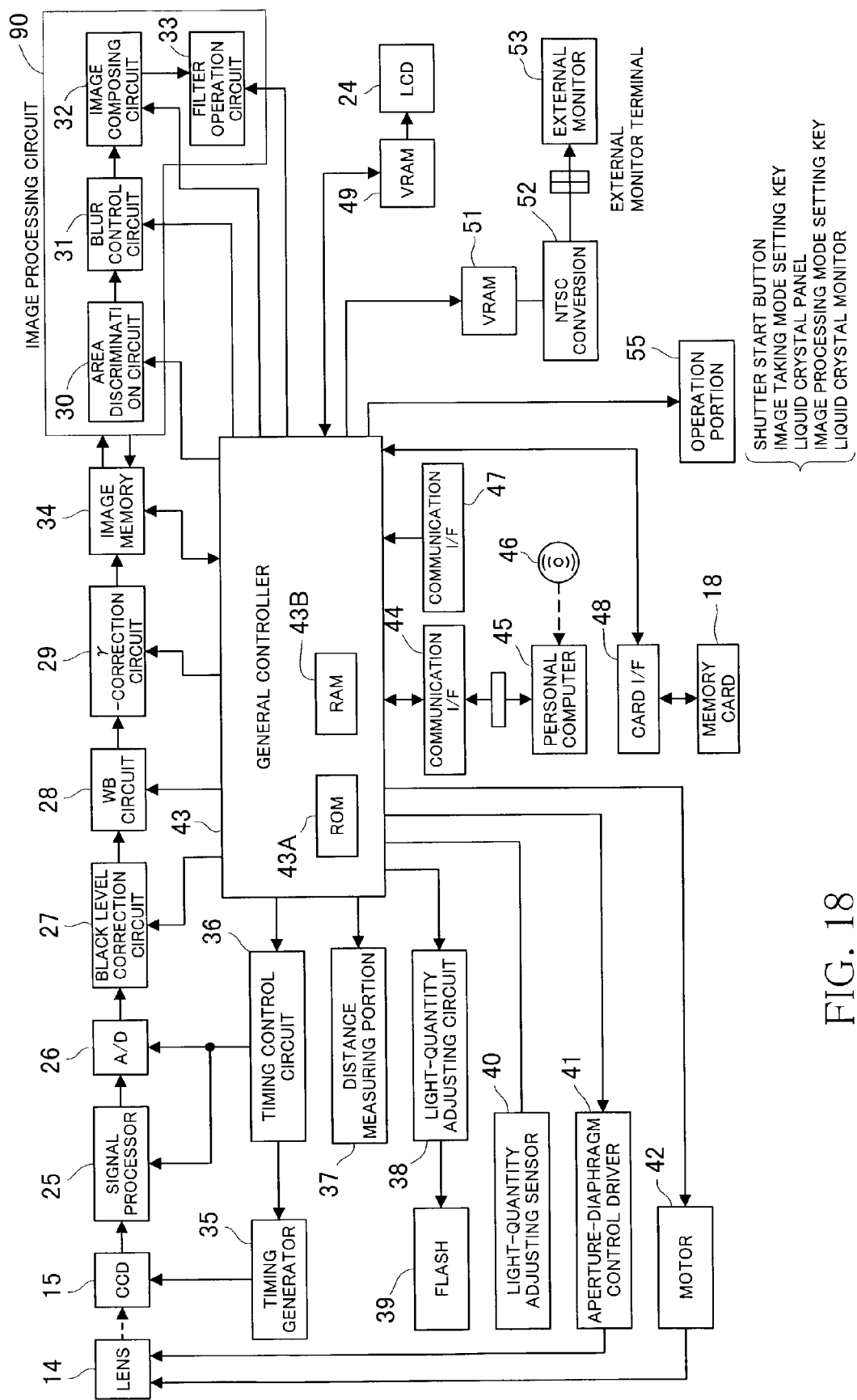
FIG. 18 is a block diagram showing the electric structure of the digital camera.

FIG. 18 is a block diagram of the digital camera 12, and the arrows denote data flows.

The CCD 15 photoelectrically converts the optical image focused by the image taking lens 14 into image signals of color components R (red), G (green) and B (blue), and outputs them. The image signal consists of sequence of pixel signals received by the respective pixel. The timing generator 35 creates various kinds of timing pulses for controlling the drive of the CCD 15.

In this digital camera 12, the exposure control is performed by adjusting the aperture-diaphragm provided in the lens barrel of the image taking lens 14 and the quantity of light exposure of the CCD 15, i.e., the electric charge accumulation time of the CCD 15 corresponding to the shutter speed. When the luminance of the photographic object is too low to appropriately adjust the quantity of light exposure by the shutter speed and the aperture value, the level of the image signal outputted from the CCD 15 is adjusted in order to compensate for the insufficient exposure. In other words, at a low luminance, the exposure is controlled by adjusting the gain. The level of the image signal is adjusted by controlling the gain of the AGC circuit in the signal processor 25.

The timing generator 35 generates the drive control signal for the CCD 15 based on the reference clock transmitted from the timing-control circuit 36. The timing generator 35 generates clock signals, such as a timing signal for starting and finishing integration (i.e., exposure), clock signals (horizontal synchronizing signals, vertical synchronizing signals, transferring signals, etc.) for controlling the reading timing of the light-receiving signals from the respective pixels. These timing signals are supplied to the CCD 15.

The signal processing circuit 25 performs predetermined analog signal processing to the image signal (analog signal) outputted from the CCD 15. The signal processing circuit 25 has a CDS (correlation double sampling) circuit for reducing the noise of the image signal and an AGC (automatic gain control) circuit for adjusting the level of the image signal by controlling the gain of this AGC circuit.

The light-quantity adjusting circuit 38 sets the light emission of the built-in flash 39 to a predetermined level determined by the general control portion 43 when the flash is used during the image taking. During the flash image taking, the flash light reflected from the photographic object is received by the sensor 40 upon starting exposure. When the quantity of light received by the sensor 40 reaches a predetermined level, the general control portion 43 supplies a flash stop signal to the light-quantity adjusting circuit 38. In response to the flash stop signal, the light-quantity adjusting circuit 38 stops the light emission of the built-in flash 39 forcibly, whereby the light emission amount of the built-in flash 39 can be regulated to correct level.

The distance measurement portion 37 measures the distance to the photographic object.

The A/D converter 26 converts each pixel signal (analog signal) into a 10-bit digital signal based on the clock for A/D conversion.

The timing-control circuit 36 generates the reference clock and clocks to the timing generator 35 and the A/D converter 26. The timing-control circuit 36 is controlled by the general control portion 43.

The black level correction circuit 27 corrects the black level of the pixel signal (hereinafter referred to as pixel data) converted by the A/D converter 26 to the reference black level. A white balance circuit (hereinafter referred to as WB circuit) 28 converts the level of the pixel data of each color component of R, G or B so that the correct white balance can be obtained after γ (gamma) correction. The WB circuit 28 converts the level of the pixel data of each color component of R, G, B using a level conversion table inputted from the general control portion 43. The conversion coefficient (or the inclination of the characteristic line) for each color component in the level conversion table is set by the general control portion 43 every picked-up image.

The γ (gamma) correction circuit 29 corrects the γ characteristic of the pixel data. The γ correction circuit 29 has, for example, six γ correction tables with different gamma characteristics, and performs a γ correction of the pixel data by the predetermined γ correction table according to the photographed scene or the photographed conditions.

The image memory 34 stores the pixel data outputted from the γ correction circuit 29. The memory capacity of the image memory 34 corresponds to M frames. Accordingly, if the CCD 15 has an n×m pixel matrix, the image memory 34 has a memory capacity of M×n×m pixel data, and each pixel data is stored in the corresponding pixel position in the memory. Based on the stored pixel data corresponding to M frames, the blur-control processing is performed in the image processing circuit 90. The processed pixel data is returned to the image memory 34 and stored therein.

The area discrimination circuit 30 discriminates an area using the blur difference, and divides the area. The blur-control circuit 31 performs the blur-control processing to the image whose area is divided by the method according to one of the aforementioned first to third embodiments. The image composing circuit 32 composes the blur-controlled images into one image.

If the image at the boundary between the area to which the blur-filtering operation was performed and the area where no blur-filtering operation was performed looks something wrong, a filter operation circuit 33 enlarges the boundary portion by several pixels in each direction toward the main photographic object area and the background area, and performs the blur-filtering operation to the enlarged area.

A VRAM 49 is a buffer memory for storing the image data to be reproduced and displayed on the LCD display portion 24. The memory capacity of the VRAM 49 corresponds to the number of pixels of the LCD display portion 24.

In the image taking preparation mode, each pixel data of the image taken by the CCD 33 every 1/30 seconds is subjected to the prescribed signal processing by the sequence from the A/D converter 26 to the γ correction circuit 29, and stored in the image memory 34. This pixel data is simultaneously transferred to the VRAM 49 via the general controller 43, and displayed on the LCD display portion 24. Whereby, the user can recognize the photographic object image on the LCD display portion 24. In the reproduction mode, image read out from the memory card 18 is subjected to the prescribed signal processing by the general controller 43, which is then transferred to the VRAM 49, and displayed on the LCD display portion 24.

The obtained image is also transmittable to an external monitor 53 via the VRAM 51 and the NTSC converting portion 52.

A card I/F 48 is an interface for writing the image data into the memory card 18 or reading the image data from the memory card 18. A communication I/F 44 is an interface based on, for example, the IEEE 1394, for externally connecting the digital camera 12 to personal computers or each network connecting devices 45. The reference numeral 46 denotes a recording medium such as a floppy disk and a magneto-optical disk used for a personal computer 63. The recording medium 46 is used to store the image sent from the digital camera 12, or is storing a program to be installed into the digital camera 12.

The operation portion 55 is constituted by the shutter start button 16, the photographing mode setting keys 20, the liquid crystal display panel 21, the image-processing mode setting keys 23, the LCD monitor 24 and the like.

The general control portion 43 comprises a microcomputer, and it organically controls the photographing operation of the digital camera 12. The general control portion 43 is provided with a ROM 43A as a recording medium storing the program for executing various processing including the area discrimination processing, the blur-control processing and the image-composing processing and the RAM 43B as a recording medium used as a work area at the time of executing the processing.

The general control portion 43 has an image number counter for counting the number of picked-up images for the blur-control processing.

Figure 19:
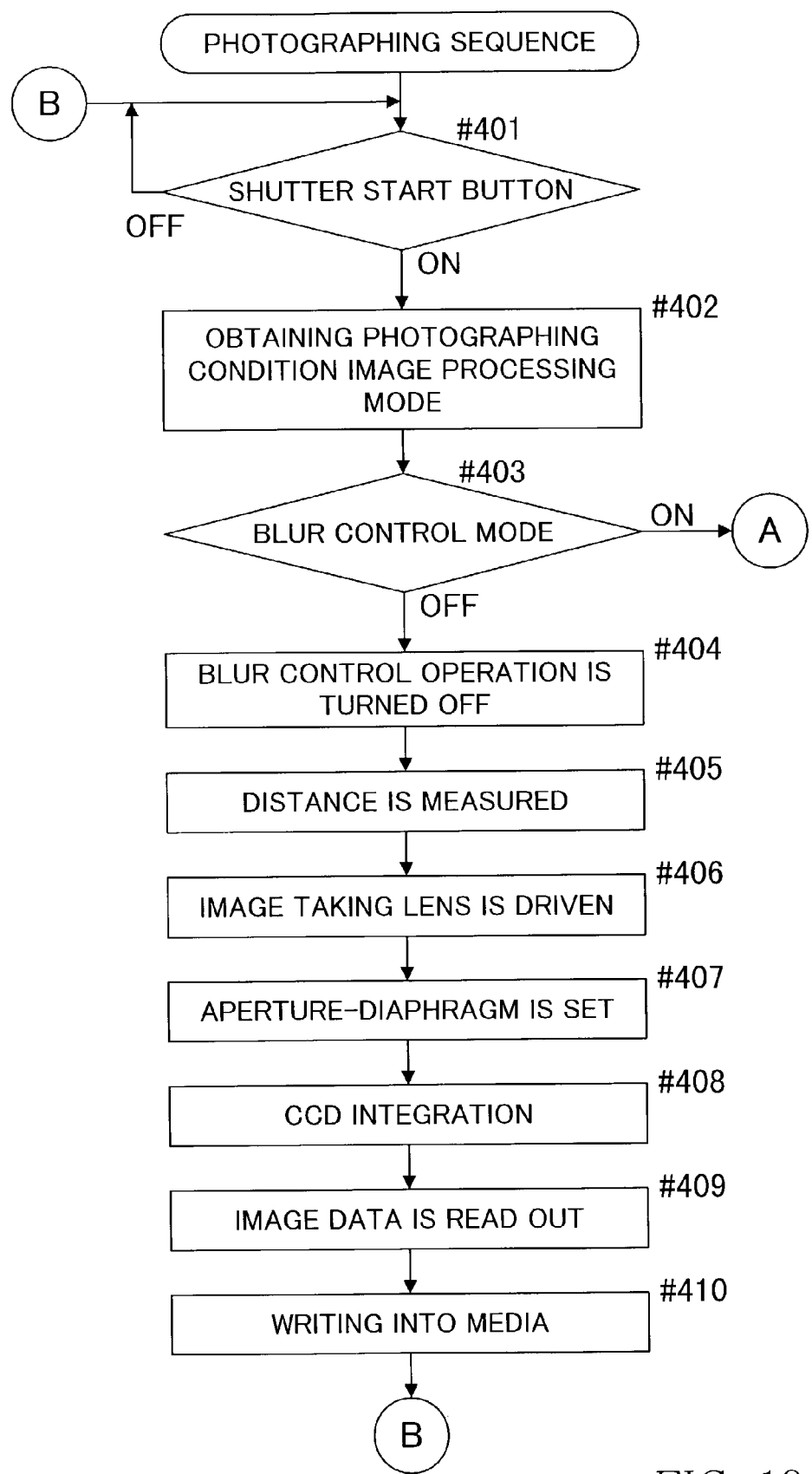
FIG. 19 is a flowchart showing the photographing sequence by the digital camera.

Next, the operation (photographing sequence) of the digital camera shown in FIGS. 16 to 18 will be explained with reference to the flowchart shown in FIGS. 19 to 20.

In this embodiment, the technique of "area discrimination using the blur difference" is used for the discrimination between the main photographic object area and the background area. In this technique, the area is discriminated by comparing a plurality of images with different focal positions. The detail thereof is disclosed by the paper entitled "Enhanced Image Acquisition by Using Multiple Differently Focused Images" [written by Naito, Kodama, Aizawa and Hatori: Transactions of the Institute of Electronics, Information and Communication Engineers D-II. Vol.79-D-II No.6 pp. 1046–1053].

In #401, it is discriminated whether the shutter start button 16 is pressed. If not pressed (OFF in #401), the routine waits until it is pressed. When pressed (ON in #401), in #402, the general control portion 43 reads out and stores the setting of the photographing conditions and the image-processing mode at that time.

Subsequently, in #403, it is discriminated whether the blur-control mode is set as the image-processing mode. If the blur-control mode is set (On in #403), the routine proceeds to #501 in FIG. 20. If the blur-control mode is not set (OFF in #403), the functions of the area discrimination circuit 30, the blur-control circuit 31, the image composing circuit 32 and the filter operation circuit 33 are set as OFF in #404.

Then, in #405, the photographic object distance is measured by the distance measurement portion 37. Subsequently, based on the distance measurement result, in #406, the image taking lens 14 is driven by driving the motor 42 (FIG. 18) so that the photographic object is focused. In #407, the aperture-diaphragm is set to a suitable value via the aperture-diaphragm control driver 41 (FIG. 18).

Then, in #408, the CCD 15 is integrated. In #409, the image data is read out. The read image data is converted into the digital data by the A/D converter 26, and subjected to the predetermined processing by the black level correction circuit 27, the WB circuit 28 and the γ correction circuit 29. Thereafter, in #401, the data is stored in the media 18, and the routine returns to #401 for the next photographing.

Figure 20:
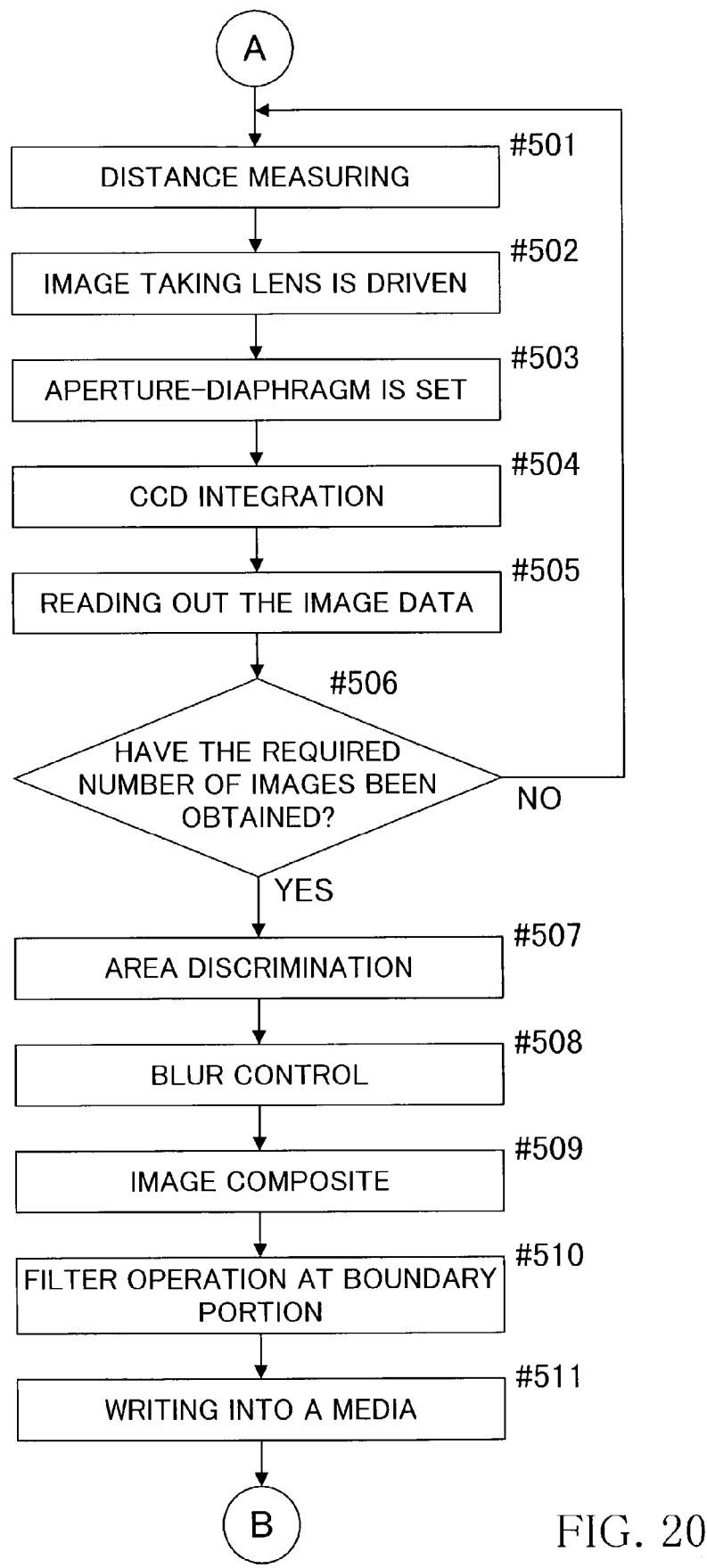
FIG. 20 is a continuation of the flowchart of FIG. 19.

In #403, if the blur-control mode is set (ON in #403), in #501 shown in FIG. 20, the photographic object distance is measured by the distance measurement portion 37 in the same manner as in the case where it is not set. Subsequently, in #502, the motor 42 is driven to drive the image taking lens 32 based on the distance measurement result so that the photographic object is focused. Furthermore, in #503, the aperture-diaphragm is set to a suitable value by the aperture-diaphragm control driver 41.

Next, in #504, the CCD 15 is integrated. Then, in #505, the image data is read out. The read data is converted into the digital data by the A/D converter 26, and then subjected to the prescribed processing by the black level correction circuit 27, the WB circuit 28 and the γ correction circuit 29. Thereafter, the data is temporarily stored in the image memory 34.

Subsequently, in #506, it is checked whether the required number of images is obtained by the general control portion 43. If not obtained (NO in #506), the routine returns to #501, and the image is obtained. However, the next image is focused on a photographic object other than the previously focused photographic objects.

If the required number of images is obtained in #506 (YES in #506), in #507, the area discrimination is performed using the blur difference by the area discrimination circuit 30.

Subsequently, in #508, blur-control processing is performed. Then, in #509, an image is composed. Since the pixel value of the main photographic object area in the blur-filter is removed in the blur-control processing, faults generated when the blur was added is removed. Accordingly, a good composite image can be obtained.

In addition, in cases where the obtained image looks something wrong at the boundary portion of the area to which the blur-filter operation was performed, in #510, the boundary portion is enlarged by several pixels in each direction toward the main photographic object area and the background area, and the enlarged area is subjected to the filter operation. The operation to be performed here is not necessary limited to the blur-filter operation. Any operation may be performed as long as it has an effect that softens the sense of incongruity in the boundary portion between the main photographic object area and the background area like the weighting mean value operation of the main photographic object area and the background area.

Thereafter, in #511, the obtained image is stored in the storing media 18 such as a memory card, and thereafter the routine returns to #501 for the next photographing.

In the aforementioned embodiment, the digital camera 12 is provided with the area discrimination circuit 30, the blur-control circuit 31 and the image composing circuit 32, and the digital camera 12 performs from the obtaining of the image to composing thereof. However, the following structure may be employed in place of the above: a program for performing an area discrimination function, a blur-control-processing function, and an image composition function is stored in a recording medium 46; the program is read by an external computer 45, and an image taken by a digital camera or a scanner is inputted into this computer, and then the computer processes the image in accordance with the program.

Figure 21:
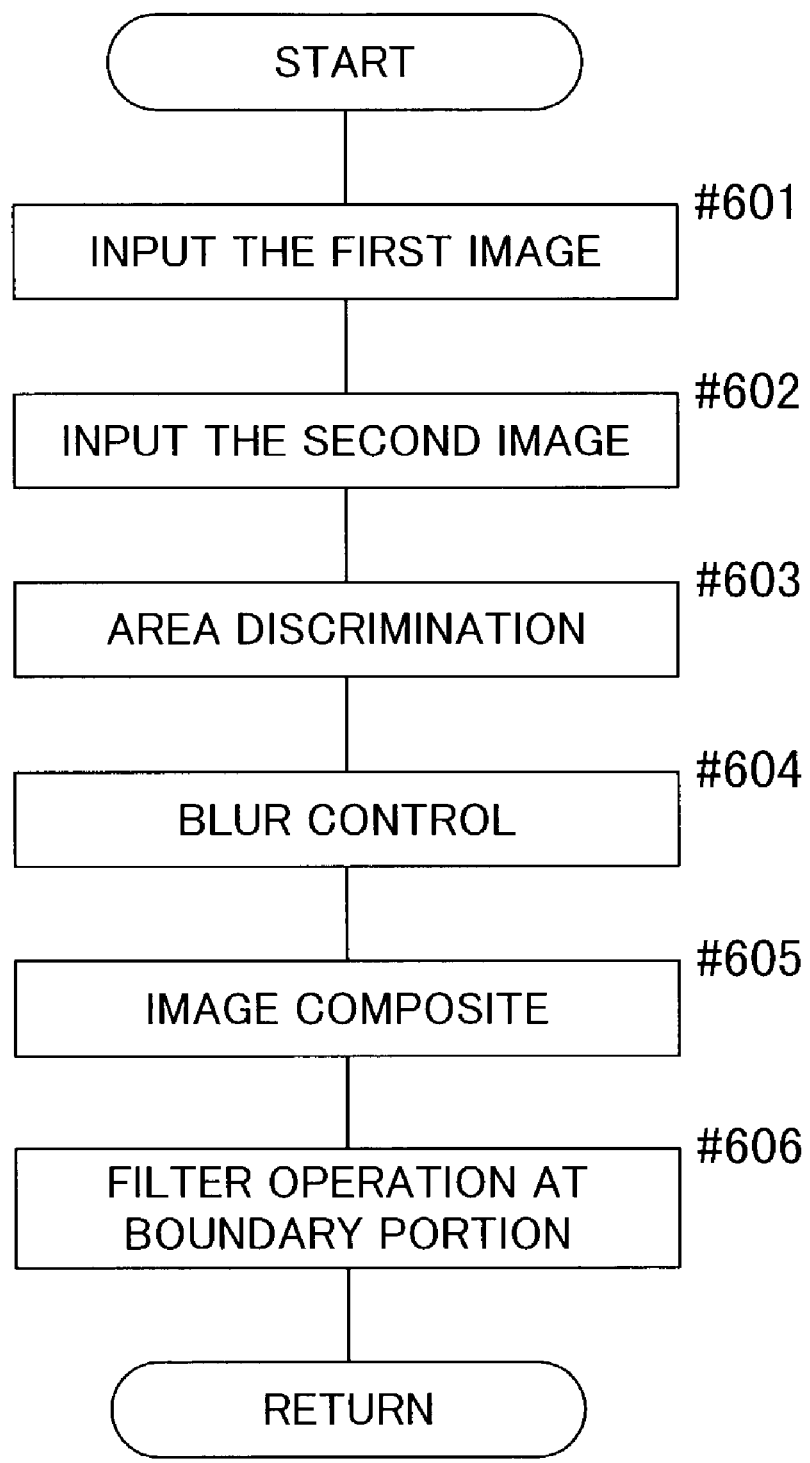
FIG. 21 is a flowchart in cases where a computer performs the image processing.

In cases where the processing is performed by a computer, one example of the flow of processing becomes as shown in FIG. 21. That is, in #601 and #602, a first image and a second image different from the first image in focus state are read by the computer. Here, the photographed image is read via a recording medium such as a memory card. The image designated by an operator is read. Thereafter, the boundary portion filter data processing, the blur-control processing, the image-composing processing and the boundary portion filter data processing are performed in #603, #604, #605 and #606, respectively. These area discrimination processing, blur-control processing, image-composing processing and boundary portion filter data processing are the same as each processing shown in #507 to #510 shown in FIG. 20, respectively. The result of this processing is displayed or stored in a recording medium.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. An image processing method, comprising the steps of:
   obtaining an image in which a first area including a first image and a second area including a second image are discriminated; and
   a control step for performing a blur control to a second image using a filter to obtain a blur-controlled second image while accompanying processing for reducing an influence of said first area at a boundary between said first area and said second area and therearound when said blur control is performed to said second image, wherein said control step includes:
      a step for assigning a pixel value of a pixel in said second area near said boundary at a periphery of said second image to said first area; and
      a step for performing said blur control to said second image by using said filter.

2. The image processing method as recited in claim 1, wherein said obtaining step includes a step for cutting out said first image from an entire image, and said method further comprising a step for composing the cut-out first image and the blur controlled second image.

3. The image processing method as recited in claim 1, wherein said step of assigning said pixel values in said second area to said first area is performed along the boundary in a strip-shaped manner at predetermined intervals.

4. An image processing method, comprising the steps of:
   obtaining an image in which a first area including a first image and a second area including a second image are discriminated; and
   a control step for performing a blur control to a second image using a filter to obtain a blur-controlled second image while adjusting processing for reducing an influence of said first area at a boundary between said first area and said second area and therearound when said blur control is performed to said second image, wherein said control step includes a step for changing a configuration of said filter near said boundary corresponding to a contour of said second area.

5. The image processing method as recited in claim 4, wherein said obtaining step includes a step for cutting out said first image from an entire image, and said method further comprising a step for composing the cut-out first image and the blur controlled second image.

6. An image processing method comprising:
obtaining an image in which a first area including a first image and a second area including a second image are discriminated and
a control step for performing a blur control to a second image using a filter to obtain a blur-controlled second image while adjusting processing for reducing an influence of said first area at a boundary between said first area and said second area and therearound when said blur control is performed to said second image, wherein said control step includes:
a step for arranging a pixel value of a pixel to be processed in place of a pixel value of a pixel not to be processed when said pixel not to be processed is included within a range of said filter; and
a step for performing said blur control to said second image in said second area by using said filter.

7. An image processing apparatus, comprising:
a processor for obtaining an image in which a first area including a first image and a second area including a second image are discriminated with each other; and
a blur controller for performing a blur control to a second image using a filter to obtain a blur-controlled second image while adjusting processing for reducing an influence of said first area at a boundary between said first area and said second area and therearound when said blur control is performed to said second image, wherein said blur controller performs said blur control to said second image by using said filter after associating a pixel value of a pixel in said second area near said boundary at a periphery of said second image with said first area.

8. The image processing apparatus as recited in claim 7, wherein said processor cuts out said first image from said entire image and composes the cut-out first image and the blur controlled second image.

9. The image processing method as recited in claim 7, wherein associating said pixel values in said second area with said first area is performed along the boundary in a strip-shaped manner at predetermined intervals.

10. An image processing apparatus comprising:
a processor for obtaining an image in which a first area including a first image and a second area including a second image are discriminated with each other; and
a blur controller for performing a blur control to a second image using a filter to obtain a blur-controlled second image while accompanying processing for reducing an influence of said first area at a boundary between said first area and said second area and therearound when said blur control is performed to said second image, wherein said blur controller performs said blur control to said second image by using said filter while changing a configuration of said filter near said boundary corresponding to a contour of said second area.

11. The image processing apparatus as recited in claim 10, wherein said processor cuts out said first image from said entire image and composes the cut-out first image and the blur controlled second image.

12. An image processing apparatus comprising:
a processor for obtaining an image in which a first area including a first image and a second area including a second image are discriminated with each other; and
a blur controller for performing a blur control to a second image using a filter to obtain a blur-controlled second image while accompanying processing for reducing an influence of said first area at a boundary between said first area and said second area and therearound when said blur control is performed to said second image, wherein said blur controller performs said blur control to said second image by using said filter after arranging a pixel value of a pixel to be processed in place of a pixel value of a pixel not to be processed when said pixel not to be processed is included within a range of said filter.

13. A computer readable program embodied in a computer readable medium for attaining the following functions:
obtaining an image in which a first area having a first image and a second area having a second image are discriminated with each other; and
performing a blur control to a second image using a filter to obtain a blur-controlled second image while altering the processing to reduce an influence of said first area at a boundary between said first area and said second area and therearound when said blur control is performed to said second image, wherein said performing a blur control includes:
arranging a pixel value of a pixel to be processed in place of a pixel value of a pixel not to be processed when said pixel not to be processed is included within a range of said filter; and
performing said blur control to said second image in said second area by using said filter.

14. The computer readable program as recited in claim 13, wherein said processing to reduce an influence of said first area is performed by associating a pixel value of a pixel in said second area near said boundary at a periphery of said second image with said first area.

15. The computer readable program as recited in claim 14, wherein said first image is cut out from an entire image, and the cut-out first image and the blur controlled second image are composed.

16. The image processing method as recited in claim 14, wherein said step of associating said pixel values in said second area with said first area is performed along the boundary in a strip-shaped manner at predetermined intervals.

17. The computer readable program as recited in claim 13, wherein said first image is cut out from an entire image, and the cut-out first image and the blur controlled second image are composed.

* * * * *